United States Patent [19]

Harrington

[11] Patent Number: 5,278,678
[45] Date of Patent: Jan. 11, 1994

[54] COLOR TABLE DISPLAY FOR INTERPOLATED COLOR AND ANTI-ALIASING

[75] Inventor: Steven J. Harrington, Holley, N.Y.

[73] Assignee: Xerox Corporation, Stamford, Conn.

[21] Appl. No.: 2,525

[22] Filed: Jan. 8, 1993

Related U.S. Application Data

[63] Continuation of Ser. No. 574,127, Aug. 29, 1990, abandoned.

[51] Int. Cl.$^5$ .................................................. G03F 3/08
[52] U.S. Cl. ...................................... 358/518; 358/525; 358/534; 345/149
[58] Field of Search .................... 358/76, 80, 456, 534, 358/525, 518; 340/703

[56] References Cited

U.S. PATENT DOCUMENTS

| | | | |
|---|---|---|---|
| 4,721,951 | 1/1988 | Holler | 340/703 |
| 4,758,885 | 7/1988 | Sasaki et al. | 358/75 |
| 4,768,082 | 8/1988 | Hiratsuka et al. | 358/75 |
| 4,812,902 | 3/1989 | Fuchsberger | 358/75 |
| 4,812,903 | 3/1989 | Wagensonner et al. | 358/80 |
| 4,829,370 | 5/1989 | Mayne et al. | 358/80 |
| 4,831,434 | 5/1989 | Fuchsberger | 358/80 |
| 4,841,360 | 6/1989 | Birgmeir | 358/80 |
| 4,876,611 | 10/1989 | Fisher et al. | 358/456 |
| 4,887,151 | 12/1989 | Wataya | 358/80 |
| 4,916,531 | 4/1990 | Ganz et al. | 358/75 |
| 4,974,067 | 11/1990 | Suzuki et al. | 358/75 |
| 4,984,071 | 1/1991 | Yonezawa | 358/80 |
| 5,065,234 | 11/1991 | Hung et al. | 358/80 |
| 5,119,186 | 6/1992 | Deacon et al. | 358/75 |

Primary Examiner—Edward L. Coles, Sr.
Assistant Examiner—Thomas L. Stoll
Attorney, Agent, or Firm—Oliff & Berridge

[57] ABSTRACT

A scheme for the color display of images on a device with a moderate sized color table first builds halftoned binary images for each of the three color components at a multiple of the display resolution. By summing bit values it then determines average values for display resolution pixels. The average values are then mapped to a color table. An example of the scheme uses the YES color model as the color coordinates. The colors are separated into luminance and chrominance components, allowing more weight to be given to the luminance from which the eye extracts most of the information. An example of the scheme yields 275 real colors for a 17×9 ×9 grid of coordinate values, which is close to the size of a 256 entry color table. The scheme provides both anti-aliasing of solid areas, such as lines and text, and color halftoning to give the appearance of colors between those available from the color table. The color table may be constructed to include color coordinate transformations and gamma correction.

8 Claims, 23 Drawing Sheets

SUMMING HIGH-RESOLUTION SINGLE BIT PER PIXEL VALUES TO GET AN AVERAGE GRAY LEVEL

| | | | | | |
|---|---|---|---|---|---|
| index = 0 | y = 0.0000 | e = 0.00 | s = 0.000 | r = 0 | g = 0 | b = 0 |
| index = 1 | y = 0.0625 | e = 0.00 | s = -0.250 | r = 0 | g = 0 | b = 127 |
| index = 2 | y = 0.0625 | e = 0.00 | s = -0.125 | r = 7 | g = 7 | b = 71 |
| index = 3 | y = 0.0625 | e = 0.00 | s = 0.000 | r = 15 | g = 15 | b = 15 |
| index = 4 | y = 0.1250 | e = 0.00 | s = -0.500 | r = 0 | g = 0 | b = 255 |
| index = 5 | y = 0.1250 | e = 0.00 | s = -0.375 | r = 7 | g = 7 | b = 199 |
| index = 6 | y = 0.1250 | e = 0.00 | s = -0.250 | r = 15 | g = 15 | b = 143 |
| index = 7 | y = 0.1250 | e = 0.00 | s = -0.125 | r = 23 | g = 23 | b = 87 |
| index = 8 | y = 0.1250 | e = 0.13 | s = 0.000 | r = 31 | g = 31 | b = 31 |
| index = 9 | y = 0.1250 | e = 0.13 | s = 0.125 | r = 67 | g = 3 | b = 99 |
| index = 10 | y = 0.1250 | e = 0.25 | s = 0.000 | r = 75 | g = 11 | b = 43 |
| index = 11 | y = 0.1250 | e = -0.13 | s = 0.000 | r = 127 | g = 0 | b = 0 |
| index = 12 | y = 0.1875 | e = 0.00 | s = -0.375 | r = 3 | g = 67 | b = 35 |
| index = 13 | y = 0.1875 | e = 0.00 | s = -0.250 | r = 23 | g = 23 | b = 215 |
| index = 14 | y = 0.1875 | e = 0.00 | s = -0.125 | r = 31 | g = 31 | b = 159 |
| index = 15 | y = 0.1875 | e = 0.00 | s = 0.000 | r = 39 | g = 39 | b = 103 |
| index = 16 | y = 0.1875 | e = 0.13 | s = -0.375 | r = 47 | g = 47 | b = 47 |
| index = 17 | y = 0.1875 | e = 0.13 | s = -0.250 | r = 67 | g = 3 | b = 227 |
| index = 18 | y = 0.1875 | e = 0.13 | s = -0.125 | r = 75 | g = 11 | b = 171 |
| index = 19 | y = 0.1875 | e = 0.13 | s = 0.000 | r = 83 | g = 19 | b = 115 |
| index = 20 | y = 0.1875 | e = 0.13 | s = 0.125 | r = 91 | g = 27 | b = 59 |
| index = 21 | y = 0.1875 | e = 0.25 | s = -0.125 | r = 99 | g = 35 | b = 3 |
| index = 22 | y = 0.1875 | e = 0.25 | s = 0.000 | r = 127 | g = 0 | b = 127 |
| index = 23 | y = 0.1875 | e = 0.25 | s = 0.125 | r = 135 | g = 7 | b = 71 |
| index = 24 | y = 0.1875 | e = 0.25 | s = 0.125 | r = 143 | g = 15 | b = 15 |

FIG. 4A

| | | | | | | |
|---|---|---|---|---|---|---|
| index = 25 | y = 0.2500 | e = -0.13 | s = -0.250 | r = 3 | g = 67 | b = 163 |
| index = 26 | y = 0.2500 | e = -0.13 | s = -0.125 | r = 11 | g = 75 | b = 107 |
| index = 27 | y = 0.2500 | e = -0.13 | s = 0.000 | r = 19 | g = 83 | b = 51 |
| index = 28 | y = 0.2500 | e = 0.00 | s = -0.375 | r = 39 | g = 39 | b = 231 |
| index = 29 | y = 0.2500 | e = 0.00 | s = -0.250 | r = 47 | g = 47 | b = 175 |
| index = 30 | y = 0.2500 | e = 0.00 | s = -0.125 | r = 55 | g = 55 | b = 119 |
| index = 31 | y = 0.2500 | e = 0.00 | s = 0.000 | r = 63 | g = 63 | b = 63 |
| index = 32 | y = 0.2500 | e = 0.00 | s = 0.125 | r = 71 | g = 71 | b = 7 |
| index = 33 | y = 0.2500 | e = 0.13 | s = -0.375 | r = 83 | g = 19 | b = 243 |
| index = 34 | y = 0.2500 | e = 0.13 | s = -0.250 | r = 91 | g = 27 | b = 187 |
| index = 35 | y = 0.2500 | e = 0.13 | s = -0.125 | r = 99 | g = 35 | b = 131 |
| index = 36 | y = 0.2500 | e = 0.13 | s = 0.000 | r = 107 | g = 43 | b = 75 |
| index = 37 | y = 0.2500 | e = 0.13 | s = 0.125 | r = 115 | g = 51 | b = 19 |
| index = 38 | y = 0.2500 | e = 0.25 | s = -0.375 | r = 127 | g = 0 | b = 255 |
| index = 39 | y = 0.2500 | e = 0.25 | s = -0.250 | r = 135 | g = 7 | b = 199 |
| index = 40 | y = 0.2500 | e = 0.25 | s = -0.125 | r = 143 | g = 15 | b = 143 |
| index = 41 | y = 0.2500 | e = 0.25 | s = 0.000 | r = 151 | g = 23 | b = 87 |
| index = 42 | y = 0.2500 | e = 0.25 | s = 0.125 | r = 159 | g = 31 | b = 31 |
| index = 43 | y = 0.2500 | e = 0.38 | s = 0.000 | r = 195 | g = 3 | b = 99 |
| index = 44 | y = 0.2500 | e = 0.38 | s = 0.125 | r = 203 | g = 11 | b = 43 |
| index = 45 | y = 0.2500 | e = 0.50 | s = 0.250 | r = 255 | g = 0 | b = 0 |
| index = 46 | y = 0.3125 | e = -0.25 | s = 0.125 | r = 0 | g = 127 | b = 0 |
| index = 47 | y = 0.3125 | e = -0.13 | s = -0.375 | r = 11 | g = 75 | b = 235 |
| index = 48 | y = 0.3125 | e = -0.13 | s = -0.250 | r = 19 | g = 83 | b = 179 |

FIG. 4B

| | | | | | | |
|---|---|---|---|---|---|---|
| index = 49 | y = 0.3125 | e = -0.13 | s = -0.125 | r = 27 | g = 91 | b = 123 |
| index = 50 | y = 0.3125 | e = -0.13 | s = 0.000 | r = 35 | g = 99 | b = 67 |
| index = 51 | y = 0.3125 | e = -0.13 | s = 0.125 | r = 43 | g = 107 | b = 11 |
| index = 52 | y = 0.3125 | e = 0.00 | s = -0.375 | r = 55 | g = 55 | b = 247 |
| index = 53 | y = 0.3125 | e = 0.00 | s = -0.250 | r = 63 | g = 63 | b = 191 |
| index = 54 | y = 0.3125 | e = 0.00 | s = -0.125 | r = 71 | g = 71 | b = 135 |
| index = 55 | y = 0.3125 | e = 0.00 | s = 0.000 | r = 79 | g = 79 | b = 79 |
| index = 56 | y = 0.3125 | e = 0.00 | s = 0.125 | r = 87 | g = 87 | b = 23 |
| index = 57 | y = 0.3125 | e = 0.13 | s = -0.250 | r = 107 | g = 43 | b = 203 |
| index = 58 | y = 0.3125 | e = 0.13 | s = -0.125 | r = 115 | g = 51 | b = 147 |
| index = 59 | y = 0.3125 | e = 0.13 | s = 0.000 | r = 123 | g = 59 | b = 91 |
| index = 60 | y = 0.3125 | e = 0.13 | s = 0.125 | r = 131 | g = 67 | b = 35 |
| index = 61 | y = 0.3125 | e = 0.25 | s = -0.250 | r = 151 | g = 23 | b = 215 |
| index = 62 | y = 0.3125 | e = 0.25 | s = -0.125 | r = 159 | g = 31 | b = 159 |
| index = 63 | y = 0.3125 | e = 0.25 | s = 0.000 | r = 167 | g = 39 | b = 103 |
| index = 64 | y = 0.3125 | e = 0.25 | s = 0.125 | r = 175 | g = 47 | b = 47 |
| index = 65 | y = 0.3125 | e = 0.38 | s = -0.250 | r = 195 | g = 3 | b = 227 |
| index = 66 | y = 0.3125 | e = 0.38 | s = -0.125 | r = 203 | g = 11 | b = 171 |
| index = 67 | y = 0.3125 | e = 0.38 | s = 0.000 | r = 211 | g = 19 | b = 115 |
| index = 68 | y = 0.3125 | e = 0.38 | s = 0.125 | r = 219 | g = 27 | b = 59 |
| index = 69 | y = 0.3125 | e = 0.38 | s = 0.250 | r = 227 | g = 35 | b = 3 |
| index = 70 | y = 0.3125 | e = 0.50 | s = 0.000 | r = 255 | g = 0 | b = 127 |
| index = 71 | y = 0.3750 | e = -0.25 | s = -0.125 | r = 0 | g = 127 | b = 127 |
| index = 72 | y = 0.3750 | e = -0.25 | s = 0.000 | r = 7 | g = 135 | b = 71 |
| index = 73 | y = 0.3750 | e = -0.25 | s = 0.125 | r = 15 | g = 143 | b = 15 |
| index = 74 | y = 0.3750 | e = -0.13 | s = -0.375 | r = 27 | g = 91 | b = 251 |
| index = 75 | y = 0.3750 | e = -0.13 | s = -0.250 | r = 35 | g = 99 | b = 195 |

FIG. 4C

| index | y | e | s | r | g | b |
|---|---|---|---|---|---|---|
| index = 76 | y = 0.3750 | e = -0.13 | s = -0.125 | r = 43 | g = 107 | b = 139 |
| index = 77 | y = 0.3750 | e = -0.13 | s = 0.000 | r = 51 | g = 115 | b = 83 |
| index = 78 | y = 0.3750 | e = -0.13 | s = 0.125 | r = 59 | g = 123 | b = 27 |
| index = 79 | y = 0.3750 | e = 0.00 | s = -0.250 | r = 79 | g = 79 | b = 207 |
| index = 80 | y = 0.3750 | e = 0.00 | s = -0.125 | r = 87 | g = 87 | b = 151 |
| index = 81 | y = 0.3750 | e = 0.00 | s = 0.000 | r = 95 | g = 95 | b = 95 |
| index = 82 | y = 0.3750 | e = 0.00 | s = 0.125 | r = 103 | g = 103 | b = 39 |
| index = 83 | y = 0.3750 | e = 0.13 | s = -0.250 | r = 123 | g = 59 | b = 219 |
| index = 84 | y = 0.3750 | e = 0.13 | s = -0.125 | r = 131 | g = 67 | b = 163 |
| index = 85 | y = 0.3750 | e = 0.13 | s = 0.000 | r = 139 | g = 75 | b = 107 |
| index = 86 | y = 0.3750 | e = 0.13 | s = 0.125 | r = 147 | g = 83 | b = 51 |
| index = 87 | y = 0.3750 | e = 0.25 | s = -0.250 | r = 167 | g = 39 | b = 231 |
| index = 88 | y = 0.3750 | e = 0.25 | s = -0.125 | r = 175 | g = 47 | b = 175 |
| index = 89 | y = 0.3750 | e = 0.25 | s = 0.000 | r = 183 | g = 55 | b = 119 |
| index = 90 | y = 0.3750 | e = 0.25 | s = 0.125 | r = 191 | g = 63 | b = 63 |
| index = 91 | y = 0.3750 | e = 0.25 | s = 0.250 | r = 199 | g = 71 | b = 7 |
| index = 92 | y = 0.3750 | e = 0.38 | s = -0.250 | r = 211 | g = 19 | b = 243 |
| index = 93 | y = 0.3750 | e = 0.38 | s = -0.125 | r = 219 | g = 27 | b = 187 |
| index = 94 | y = 0.3750 | e = 0.38 | s = 0.000 | r = 227 | g = 35 | b = 131 |
| index = 95 | y = 0.3750 | e = 0.38 | s = 0.125 | r = 235 | g = 43 | b = 75 |
| index = 96 | y = 0.3750 | e = 0.38 | s = 0.250 | r = 243 | g = 51 | b = 19 |
| index = 97 | y = 0.3750 | e = 0.50 | s = -0.250 | r = 255 | g = 0 | b = 255 |
| index = 98 | y = 0.4375 | e = -0.25 | s = -0.375 | r = 0 | g = 127 | b = 255 |
| index = 99 | y = 0.4375 | e = -0.25 | s = -0.250 | r = 7 | g = 135 | b = 199 |
| index = 100 | y = 0.4375 | e = -0.25 | s = -0.125 | r = 15 | g = 143 | b = 143 |
| index = 101 | y = 0.4375 | e = -0.25 | s = 0.000 | r = 23 | g = 151 | b = 87 |
| index = 102 | y = 0.4375 | e = -0.25 | s = 0.125 | r = 31 | g = 159 | b = 31 |

FIG. 4D

| | | | | | |
|---|---|---|---|---|---|
| index = 103 | y = 0.4375 | e = -0.13 | s = -0.250 | r = 51 | g = 115 | b = 211 |
| index = 104 | y = 0.4375 | e = -0.13 | s = -0.125 | r = 59 | g = 123 | b = 155 |
| index = 105 | y = 0.4375 | e = -0.13 | s = 0.000 | r = 67 | g = 131 | b = 99 |
| index = 106 | y = 0.4375 | e = -0.13 | s = 0.125 | r = 75 | g = 139 | b = 43 |
| index = 107 | y = 0.4375 | e = 0.00 | s = -0.250 | r = 95 | g = 95 | b = 223 |
| index = 108 | y = 0.4375 | e = 0.00 | s = -0.125 | r = 103 | g = 103 | b = 167 |
| index = 109 | y = 0.4375 | e = 0.00 | s = 0.000 | r = 111 | g = 111 | b = 111 |
| index = 110 | y = 0.4375 | e = 0.00 | s = 0.125 | r = 119 | g = 119 | b = 55 |
| index = 111 | y = 0.4375 | e = 0.00 | s = 0.250 | r = 127 | g = 127 | b = 0 |
| index = 112 | y = 0.4375 | e = 0.13 | s = -0.250 | r = 139 | g = 75 | b = 235 |
| index = 113 | y = 0.4375 | e = 0.13 | s = -0.125 | r = 147 | g = 83 | b = 179 |
| index = 114 | y = 0.4375 | e = 0.13 | s = 0.000 | r = 155 | g = 91 | b = 123 |
| index = 115 | y = 0.4375 | e = 0.13 | s = 0.125 | r = 163 | g = 99 | b = 67 |
| index = 116 | y = 0.4375 | e = 0.25 | s = -0.250 | r = 171 | g = 107 | b = 11 |
| index = 117 | y = 0.4375 | e = 0.25 | s = -0.125 | r = 183 | g = 55 | b = 247 |
| index = 118 | y = 0.4375 | e = 0.25 | s = 0.000 | r = 191 | g = 63 | b = 191 |
| index = 119 | y = 0.4375 | e = 0.25 | s = 0.125 | r = 199 | g = 71 | b = 135 |
| index = 120 | y = 0.4375 | e = 0.25 | s = 0.250 | r = 207 | g = 79 | b = 79 |
| index = 121 | y = 0.4375 | e = 0.38 | s = -0.125 | r = 215 | g = 87 | b = 23 |
| index = 122 | y = 0.4375 | e = 0.38 | s = 0.000 | r = 235 | g = 43 | b = 203 |
| index = 123 | y = 0.4375 | e = 0.38 | s = 0.125 | r = 243 | g = 51 | b = 147 |
| index = 124 | y = 0.4375 | e = -0.38 | s = -0.250 | r = 251 | g = 59 | b = 91 |
| index = 125 | y = 0.5000 | e = -0.25 | s = -0.125 | r = 3 | g = 195 | b = 35 |
| index = 126 | y = 0.5000 | e = -0.25 | s = 0.125 | r = 23 | g = 151 | b = 215 |
| index = 127 | y = 0.5000 | e = -0.25 | s = -0.125 | r = 31 | g = 159 | b = 159 |
| index = 128 | y = 0.5000 | e = 0.00 | s = 0.000 | r = 39 | g = 167 | b = 103 |
| index = 129 | y = 0.5000 | e = -0.25 | s = 0.125 | r = 47 | g = 175 | b = 47 |

FIG. 4E

| index = 130 | y = 0.5000 | e = -0.13 | s = -0.250 | r = 67 | g = 131 | b = 227 |
| index = 131 | y = 0.5000 | e = -0.13 | s = -0.125 | r = 75 | g = 139 | b = 171 |
| index = 132 | y = 0.5000 | e = -0.13 | s = 0.000 | r = 83 | g = 147 | b = 115 |
| index = 133 | y = 0.5000 | e = -0.13 | s = 0.125 | r = 91 | g = 155 | b = 59 |
| index = 134 | y = 0.5000 | e = -0.13 | s = 0.250 | r = 99 | g = 163 | b = 3 |
| index = 135 | y = 0.5000 | e = 0.00 | s = -0.250 | r = 111 | g = 111 | b = 239 |
| index = 136 | y = 0.5000 | e = 0.00 | s = -0.125 | r = 119 | g = 119 | b = 183 |
| index = 137 | y = 0.5000 | e = 0.00 | s = 0.000 | r = 127 | g = 127 | b = 127 |
| index = 138 | y = 0.5000 | e = 0.00 | s = 0.125 | r = 135 | g = 135 | b = 71 |
| index = 139 | y = 0.5000 | e = 0.00 | s = 0.250 | r = 143 | g = 143 | b = 15 |
| index = 140 | y = 0.5000 | e = 0.13 | s = -0.250 | r = 155 | g = 91 | b = 251 |
| index = 141 | y = 0.5000 | e = 0.13 | s = -0.125 | r = 163 | g = 99 | b = 195 |
| index = 142 | y = 0.5000 | e = 0.13 | s = 0.000 | r = 171 | g = 107 | b = 139 |
| index = 143 | y = 0.5000 | e = 0.13 | s = 0.125 | r = 179 | g = 115 | b = 83 |
| index = 144 | y = 0.5000 | e = 0.13 | s = 0.250 | r = 187 | g = 123 | b = 27 |
| index = 145 | y = 0.5000 | e = 0.25 | s = -0.125 | r = 207 | g = 79 | b = 207 |
| index = 146 | y = 0.5000 | e = 0.25 | s = 0.000 | r = 215 | g = 87 | b = 151 |
| index = 147 | y = 0.5000 | e = 0.25 | s = 0.125 | r = 223 | g = 95 | b = 95 |
| index = 148 | y = 0.5000 | e = 0.25 | s = 0.250 | r = 231 | g = 103 | b = 39 |
| index = 149 | y = 0.5000 | e = 0.38 | s = -0.125 | r = 251 | g = 59 | b = 219 |
| index = 150 | y = 0.5625 | e = -0.38 | s = -0.125 | r = 3 | g = 195 | b = 163 |
| index = 151 | y = 0.5625 | e = -0.38 | s = 0.000 | r = 11 | g = 203 | b = 107 |
| index = 152 | y = 0.5625 | e = -0.38 | s = 0.125 | r = 19 | g = 211 | b = 51 |
| index = 153 | y = 0.5625 | e = -0.25 | s = -0.250 | r = 39 | g = 167 | b = 231 |
| index = 154 | y = 0.5625 | e = -0.25 | s = -0.125 | r = 47 | g = 175 | b = 175 |
| index = 155 | y = 0.5625 | e = -0.25 | s = 0.000 | r = 55 | g = 183 | b = 119 |
| index = 156 | y = 0.5625 | e = -0.25 | s = 0.125 | r = 63 | g = 191 | b = 63 |

FIG. 4F

| | | | | | |
|---|---|---|---|---|---|
| index = 157 | y = 0.5625 | e = -0.25 | s = 0.250 | r = 71 | g = 199 | b = 7 |
| index = 158 | y = 0.5625 | e = -0.13 | s = -0.250 | r = 83 | g = 147 | b = 243 |
| index = 159 | y = 0.5625 | e = -0.13 | s = -0.125 | r = 91 | g = 155 | b = 187 |
| index = 160 | y = 0.5625 | e = -0.13 | s = 0.000 | r = 99 | g = 163 | b = 131 |
| index = 161 | y = 0.5625 | e = -0.13 | s = 0.125 | r = 107 | g = 171 | b = 75 |
| index = 162 | y = 0.5625 | e = -0.13 | s = 0.250 | r = 115 | g = 179 | b = 19 |
| index = 163 | y = 0.5625 | e = 0.00 | s = -0.250 | r = 127 | g = 127 | b = 255 |
| index = 164 | y = 0.5625 | e = 0.00 | s = -0.125 | r = 135 | g = 135 | b = 199 |
| index = 165 | y = 0.5625 | e = 0.00 | s = 0.000 | r = 143 | g = 143 | b = 143 |
| index = 166 | y = 0.5625 | e = 0.00 | s = 0.125 | r = 151 | g = 151 | b = 87 |
| index = 167 | y = 0.5625 | e = 0.00 | s = 0.250 | r = 159 | g = 159 | b = 31 |
| index = 168 | y = 0.5625 | e = 0.13 | s = -0.125 | r = 179 | g = 115 | b = 211 |
| index = 169 | y = 0.5625 | e = 0.13 | s = 0.000 | r = 187 | g = 123 | b = 155 |
| index = 170 | y = 0.5625 | e = 0.13 | s = 0.125 | r = 195 | g = 131 | b = 99 |
| index = 171 | y = 0.5625 | e = 0.13 | s = 0.250 | r = 203 | g = 139 | b = 43 |
| index = 172 | y = 0.5625 | e = 0.25 | s = 0.000 | r = 223 | g = 95 | b = 223 |
| index = 173 | y = 0.5625 | e = 0.25 | s = 0.125 | r = 231 | g = 103 | b = 167 |
| index = 174 | y = 0.5625 | e = 0.25 | s = 0.250 | r = 239 | g = 111 | b = 111 |
| index = 175 | y = 0.5625 | e = 0.25 | s = 0.375 | r = 247 | g = 119 | b = 55 |
| index = 176 | y = 0.5625 | e = 0.25 | s = 0.250 | r = 255 | g = 127 | b = 0 |
| index = 177 | y = 0.6250 | e = -0.50 | s = -0.250 | r = 0 | g = 255 | b = 0 |
| index = 178 | y = 0.6250 | e = -0.38 | s = -0.250 | r = 11 | g = 203 | b = 235 |
| index = 179 | y = 0.6250 | e = -0.38 | s = -0.125 | r = 19 | g = 211 | b = 179 |
| index = 180 | y = 0.6250 | e = -0.38 | s = 0.000 | r = 27 | g = 219 | b = 123 |
| index = 181 | y = 0.6250 | e = -0.38 | s = 0.125 | r = 35 | g = 227 | b = 67 |
| index = 182 | y = 0.6250 | e = -0.38 | s = 0.250 | r = 43 | g = 235 | b = 11 |
| index = 183 | y = 0.6250 | e = -0.25 | s = -0.250 | r = 55 | g = 183 | b = 247 |

FIG. 4G

| | | | | | |
|---|---|---|---|---|---|
| index = 184 | y = 0.6250 | e = -0.25 | s = -0.125 | r = 63 | g = 191 | b = 191 |
| index = 185 | y = 0.6250 | e = -0.25 | s = 0.000 | r = 71 | g = 199 | b = 135 |
| index = 186 | y = 0.6250 | e = -0.25 | s = 0.125 | r = 79 | g = 207 | b = 79 |
| index = 187 | y = 0.6250 | e = -0.25 | s = 0.250 | r = 87 | g = 215 | b = 23 |
| index = 188 | y = 0.6250 | e = -0.13 | s = -0.125 | r = 107 | g = 171 | b = 203 |
| index = 189 | y = 0.6250 | e = -0.13 | s = 0.000 | r = 115 | g = 179 | b = 147 |
| index = 190 | y = 0.6250 | e = -0.13 | s = 0.125 | r = 123 | g = 187 | b = 91 |
| index = 191 | y = 0.6250 | e = -0.13 | s = 0.250 | r = 131 | g = 195 | b = 35 |
| index = 192 | y = 0.6250 | e = 0.00 | s = -0.125 | r = 151 | g = 151 | b = 215 |
| index = 193 | y = 0.6250 | e = 0.00 | s = 0.000 | r = 159 | g = 159 | b = 159 |
| index = 194 | y = 0.6250 | e = 0.00 | s = 0.125 | r = 167 | g = 167 | b = 103 |
| index = 195 | y = 0.6250 | e = 0.00 | s = 0.250 | r = 175 | g = 175 | b = 47 |
| index = 196 | y = 0.6250 | e = 0.13 | s = -0.125 | r = 195 | g = 131 | b = 227 |
| index = 197 | y = 0.6250 | e = 0.13 | s = 0.000 | r = 203 | g = 139 | b = 171 |
| index = 198 | y = 0.6250 | e = 0.13 | s = 0.125 | r = 211 | g = 147 | b = 115 |
| index = 199 | y = 0.6250 | e = 0.13 | s = 0.250 | r = 219 | g = 155 | b = 59 |
| index = 200 | y = 0.6250 | e = 0.13 | s = 0.375 | r = 227 | g = 163 | b = 3 |
| index = 201 | y = 0.6250 | e = 0.25 | s = -0.125 | r = 239 | g = 111 | b = 239 |
| index = 202 | y = 0.6250 | e = 0.25 | s = 0.000 | r = 247 | g = 119 | b = 183 |
| index = 203 | y = 0.6250 | e = 0.25 | s = 0.125 | r = 255 | g = 127 | b = 127 |
| index = 204 | y = 0.6875 | e = -0.50 | s = 0.000 | r = 0 | g = 255 | b = 127 |
| index = 205 | y = 0.6875 | e = -0.38 | s = -0.250 | r = 27 | g = 219 | b = 251 |
| index = 206 | y = 0.6875 | e = -0.38 | s = -0.125 | r = 35 | g = 227 | b = 195 |
| index = 207 | y = 0.6875 | e = -0.38 | s = 0.000 | r = 43 | g = 235 | b = 139 |
| index = 208 | y = 0.6875 | e = -0.38 | s = 0.125 | r = 51 | g = 243 | b = 83 |
| index = 209 | y = 0.6875 | e = -0.38 | s = 0.250 | r = 59 | g = 251 | b = 27 |
| index = 210 | y = 0.6875 | e = -0.25 | s = -0.125 | r = 79 | g = 207 | b = 207 |

FIG. 4H

| | | | | | |
|---|---|---|---|---|---|
| index = 211 | y = 0.6875 | e = -0.25 | s = 0.000 | r = 87 | g = 215 | b = 151 |
| index = 212 | y = 0.6875 | e = -0.25 | s = 0.125 | r = 95 | g = 223 | b = 95 |
| index = 213 | y = 0.6875 | e = -0.25 | s = 0.250 | r = 103 | g = 231 | b = 39 |
| index = 214 | y = 0.6875 | e = -0.13 | s = -0.125 | r = 123 | g = 187 | b = 219 |
| index = 215 | y = 0.6875 | e = -0.13 | s = 0.000 | r = 131 | g = 195 | b = 163 |
| index = 216 | y = 0.6875 | e = -0.13 | s = 0.125 | r = 139 | g = 203 | b = 107 |
| index = 217 | y = 0.6875 | e = -0.13 | s = 0.250 | r = 147 | g = 211 | b = 51 |
| index = 218 | y = 0.6875 | e = 0.00 | s = -0.125 | r = 167 | g = 167 | b = 231 |
| index = 219 | y = 0.6875 | e = 0.00 | s = 0.000 | r = 175 | g = 175 | b = 175 |
| index = 220 | y = 0.6875 | e = 0.00 | s = 0.125 | r = 183 | g = 183 | b = 119 |
| index = 221 | y = 0.6875 | e = 0.00 | s = 0.250 | r = 191 | g = 191 | b = 63 |
| index = 222 | y = 0.6875 | e = 0.00 | s = 0.375 | r = 199 | g = 199 | b = 7 |
| index = 223 | y = 0.6875 | e = 0.13 | s = -0.125 | r = 211 | g = 147 | b = 243 |
| index = 224 | y = 0.6875 | e = 0.13 | s = 0.000 | r = 219 | g = 155 | b = 187 |
| index = 225 | y = 0.6875 | e = 0.13 | s = 0.125 | r = 227 | g = 163 | b = 131 |
| index = 226 | y = 0.6875 | e = 0.13 | s = 0.250 | r = 235 | g = 171 | b = 75 |
| index = 227 | y = 0.6875 | e = 0.13 | s = 0.375 | r = 243 | g = 179 | b = 19 |
| index = 228 | y = 0.6875 | e = 0.25 | s = -0.125 | r = 255 | g = 127 | b = 255 |
| index = 229 | y = 0.7500 | e = -0.50 | s = -0.250 | r = 0 | g = 255 | b = 255 |
| index = 230 | y = 0.7500 | e = -0.38 | s = -0.125 | r = 51 | g = 243 | b = 211 |
| index = 231 | y = 0.7500 | e = -0.38 | s = 0.000 | r = 59 | g = 251 | b = 155 |
| index = 232 | y = 0.7500 | e = -0.25 | s = -0.125 | r = 95 | g = 223 | b = 223 |
| index = 233 | y = 0.7500 | e = -0.25 | s = 0.000 | r = 103 | g = 231 | b = 167 |
| index = 234 | y = 0.7500 | e = -0.25 | s = 0.125 | r = 111 | g = 239 | b = 111 |
| index = 235 | y = 0.7500 | e = -0.25 | s = 0.250 | r = 119 | g = 247 | b = 55 |
| index = 236 | y = 0.7500 | e = -0.25 | s = 0.375 | r = 127 | g = 255 | b = 0 |
| index = 237 | y = 0.7500 | e = -0.13 | s = -0.125 | r = 139 | g = 203 | b = 235 |

FIG. 4I

| | | | | | | |
|---|---|---|---|---|---|---|
| index = 238 | y = 0.7500 | e = -0.13 | s = 0.000 | r = 147 | g = 211 | b = 179 |
| index = 239 | y = 0.7500 | e = -0.13 | s = 0.125 | r = 155 | g = 219 | b = 123 |
| index = 240 | y = 0.7500 | e = -0.13 | s = 0.250 | r = 163 | g = 227 | b = 67 |
| index = 241 | y = 0.7500 | e = -0.13 | s = 0.375 | r = 171 | g = 235 | b = 11 |
| index = 242 | y = 0.7500 | e = 0.00 | s = -0.125 | r = 183 | g = 183 | b = 247 |
| index = 243 | y = 0.7500 | e = 0.00 | s = 0.000 | r = 191 | g = 191 | b = 191 |
| index = 244 | y = 0.7500 | e = 0.00 | s = 0.125 | r = 199 | g = 199 | b = 135 |
| index = 245 | y = 0.7500 | e = 0.00 | s = 0.250 | r = 207 | g = 207 | b = 79 |
| index = 246 | y = 0.7500 | e = 0.00 | s = 0.375 | r = 215 | g = 215 | b = 23 |
| index = 247 | y = 0.7500 | e = 0.13 | s = -0.125 | r = 235 | g = 171 | b = 203 |
| index = 248 | y = 0.7500 | e = 0.13 | s = 0.000 | r = 243 | g = 179 | b = 147 |
| index = 249 | y = 0.7500 | e = 0.13 | s = 0.125 | r = 251 | g = 187 | b = 91 |
| index = 250 | y = 0.8125 | e = -0.25 | s = 0.000 | r = 111 | g = 239 | b = 239 |
| index = 251 | y = 0.8125 | e = -0.25 | s = 0.125 | r = 119 | g = 247 | b = 183 |
| index = 252 | y = 0.8125 | e = -0.25 | s = 0.250 | r = 127 | g = 255 | b = 127 |
| index = 253 | y = 0.8125 | e = -0.13 | s = 0.000 | r = 155 | g = 219 | b = 251 |
| index = 254 | y = 0.8125 | e = -0.13 | s = 0.125 | r = 163 | g = 227 | b = 195 |
| index = 255 | y = 0.8125 | e = -0.13 | s = 0.250 | r = 171 | g = 235 | b = 139 |
| index = 256 | y = 0.8125 | e = -0.13 | s = 0.375 | r = 179 | g = 243 | b = 83 |
| index = 257 | y = 0.8125 | e = 0.00 | s = 0.000 | r = 187 | g = 251 | b = 27 |
| index = 258 | y = 0.8125 | e = 0.00 | s = 0.125 | r = 207 | g = 207 | b = 207 |
| index = 259 | y = 0.8125 | e = 0.00 | s = 0.250 | r = 215 | g = 215 | b = 151 |
| index = 260 | y = 0.8125 | e = 0.00 | s = 0.375 | r = 223 | g = 223 | b = 95 |
| index = 261 | y = 0.8125 | e = 0.13 | s = 0.000 | r = 231 | g = 231 | b = 39 |
| index = 262 | y = 0.8125 | e = -0.25 | s = -0.125 | r = 251 | g = 187 | b = 219 |
| index = 263 | y = 0.8750 | e = -0.25 | s = 0.000 | r = 127 | g = 255 | b = 255 |
| index = 264 | y = 0.8750 | e = -0.13 | s = 0.000 | r = 179 | g = 243 | b = 211 |

FIG. 4J

| | | | | | |
|---|---|---|---|---|---|
| index = 265 | y = 0.8750 | e = -0.13 | s = 0.125 | r = 187 | g = 251 | b = 155 |
| index = 266 | y = 0.8750 | e = 0.00 | s = 0.000 | r = 223 | g = 223 | b = 223 |
| index = 267 | y = 0.8750 | e = 0.00 | s = 0.125 | r = 231 | g = 231 | b = 167 |
| index = 268 | y = 0.8750 | e = 0.00 | s = 0.250 | r = 239 | g = 239 | b = 111 |
| index = 269 | y = 0.8750 | e = 0.00 | s = 0.375 | r = 247 | g = 247 | b = 55 |
| index = 270 | y = 0.8750 | e = 0.00 | s = 0.500 | r = 255 | g = 255 | b = 0 |
| index = 271 | y = 0.9375 | e = 0.00 | s = 0.000 | r = 239 | g = 239 | b = 239 |
| index = 272 | y = 0.9375 | e = 0.00 | s = 0.125 | r = 247 | g = 247 | b = 183 |
| index = 273 | y = 0.9375 | e = 0.00 | s = 0.250 | r = 255 | g = 255 | b = 127 |
| index = 274 | y = 1.0000 | e = 0.00 | s = 0.000 | r = 255 | g = 255 | b = 255 |

FIG. 4K

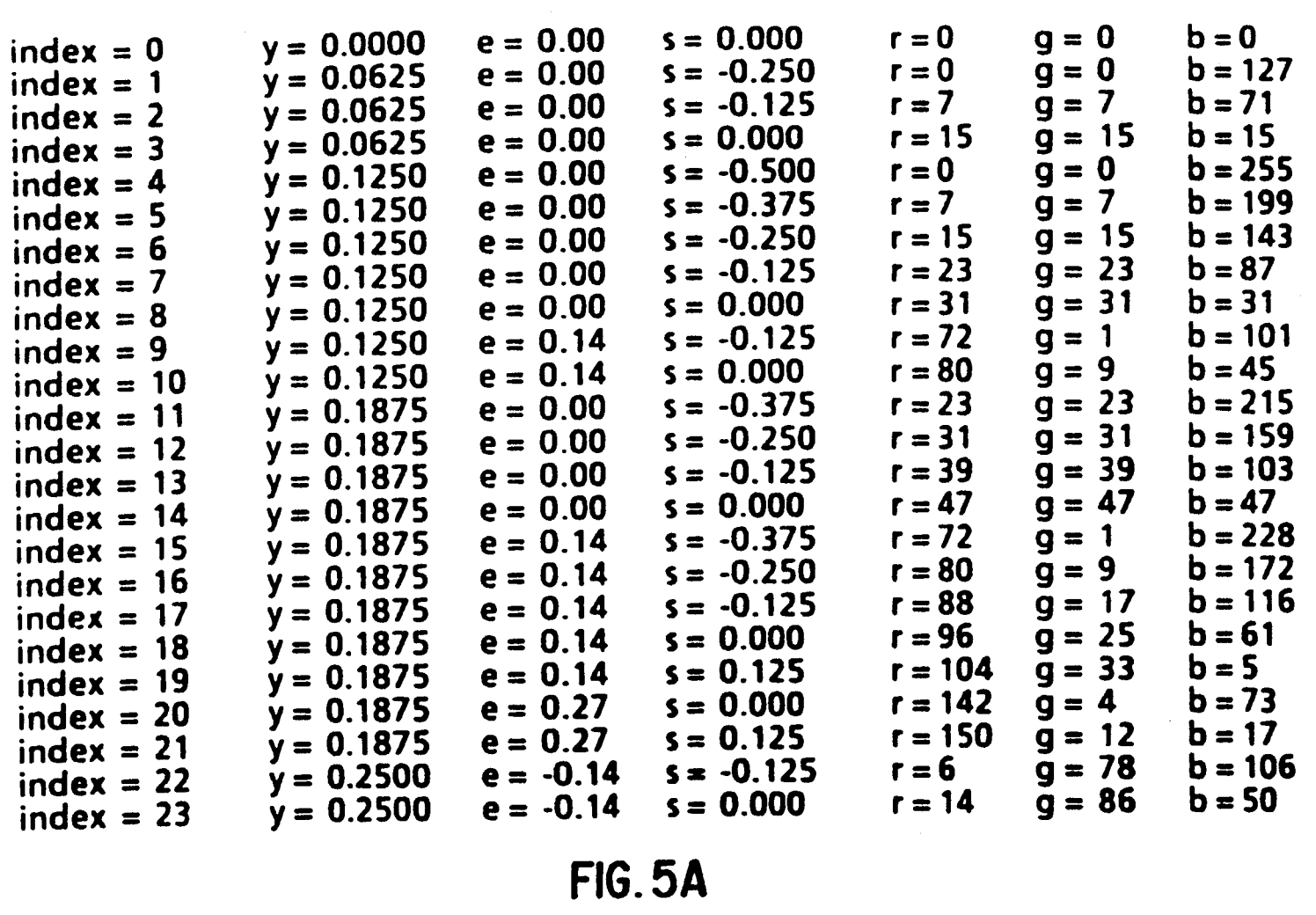

| index | y | e | s | r | g | b |
|---|---|---|---|---|---|---|
| index = 0 | y = 0.0000 | e = 0.00 | s = 0.000 | r = 0 | g = 0 | b = 0 |
| index = 1 | y = 0.0625 | e = 0.00 | s = -0.250 | r = 0 | g = 0 | b = 127 |
| index = 2 | y = 0.0625 | e = 0.00 | s = -0.125 | r = 7 | g = 7 | b = 71 |
| index = 3 | y = 0.0625 | e = 0.00 | s = 0.000 | r = 15 | g = 15 | b = 15 |
| index = 4 | y = 0.1250 | e = 0.00 | s = -0.500 | r = 0 | g = 0 | b = 255 |
| index = 5 | y = 0.1250 | e = 0.00 | s = -0.375 | r = 7 | g = 7 | b = 199 |
| index = 6 | y = 0.1250 | e = 0.00 | s = -0.250 | r = 15 | g = 15 | b = 143 |
| index = 7 | y = 0.1250 | e = 0.00 | s = -0.125 | r = 23 | g = 23 | b = 87 |
| index = 8 | y = 0.1250 | e = 0.14 | s = 0.000 | r = 31 | g = 31 | b = 31 |
| index = 9 | y = 0.1250 | e = 0.14 | s = -0.125 | r = 72 | g = 1 | b = 101 |
| index = 10 | y = 0.1250 | e = 0.00 | s = 0.000 | r = 80 | g = 9 | b = 45 |
| index = 11 | y = 0.1875 | e = 0.00 | s = -0.375 | r = 23 | g = 23 | b = 215 |
| index = 12 | y = 0.1875 | e = 0.00 | s = -0.250 | r = 31 | g = 31 | b = 159 |
| index = 13 | y = 0.1875 | e = 0.00 | s = -0.125 | r = 39 | g = 39 | b = 103 |
| index = 14 | y = 0.1875 | e = 0.00 | s = 0.000 | r = 47 | g = 47 | b = 47 |
| index = 15 | y = 0.1875 | e = 0.14 | s = -0.375 | r = 72 | g = 1 | b = 228 |
| index = 16 | y = 0.1875 | e = 0.14 | s = -0.250 | r = 80 | g = 9 | b = 172 |
| index = 17 | y = 0.1875 | e = 0.14 | s = -0.125 | r = 88 | g = 17 | b = 116 |
| index = 18 | y = 0.1875 | e = 0.14 | s = 0.000 | r = 96 | g = 25 | b = 61 |
| index = 19 | y = 0.1875 | e = 0.27 | s = 0.125 | r = 104 | g = 33 | b = 5 |
| index = 20 | y = 0.1875 | e = 0.27 | s = 0.000 | r = 142 | g = 4 | b = 73 |
| index = 21 | y = 0.1875 | e = -0.14 | s = 0.125 | r = 150 | g = 12 | b = 17 |
| index = 22 | y = 0.2500 | e = -0.14 | s = -0.125 | r = 6 | g = 78 | b = 106 |
| index = 23 | y = 0.2500 | e = 0.00 | s = 0.000 | r = 14 | g = 86 | b = 50 |

FIG. 5A

| index = 24 | y = 0.2500 | e = 0.00 | s = -0.375 | r = 39 | g = 39 | b = 231 |
| index = 25 | y = 0.2500 | e = 0.00 | s = -0.250 | r = 47 | g = 47 | b = 175 |
| index = 26 | y = 0.2500 | e = 0.00 | s = -0.125 | r = 55 | g = 55 | b = 119 |
| index = 27 | y = 0.2500 | e = 0.00 | s = 0.000 | r = 63 | g = 63 | b = 63 |
| index = 28 | y = 0.2500 | e = 0.00 | s = 0.125 | r = 71 | g = 71 | b = 7 |
| index = 29 | y = 0.2500 | e = 0.14 | s = -0.375 | r = 88 | g = 17 | b = 244 |
| index = 30 | y = 0.2500 | e = 0.14 | s = -0.250 | r = 96 | g = 25 | b = 188 |
| index = 31 | y = 0.2500 | e = 0.14 | s = -0.125 | r = 104 | g = 33 | b = 132 |
| index = 32 | y = 0.2500 | e = 0.14 | s = 0.000 | r = 112 | g = 41 | b = 77 |
| index = 33 | y = 0.2500 | e = 0.14 | s = 0.125 | r = 120 | g = 49 | b = 21 |
| index = 34 | y = 0.2500 | e = 0.27 | s = -0.250 | r = 142 | g = 4 | b = 201 |
| index = 35 | y = 0.2500 | e = 0.27 | s = -0.125 | r = 150 | g = 12 | b = 145 |
| index = 36 | y = 0.2500 | e = 0.27 | s = 0.000 | r = 158 | g = 20 | b = 89 |
| index = 37 | y = 0.2500 | e = 0.27 | s = 0.125 | r = 166 | g = 28 | b = 33 |
| index = 38 | y = 0.2500 | e = 0.39 | s = 0.000 | r = 200 | g = 1 | b = 101 |
| index = 39 | y = 0.2500 | e = 0.39 | s = 0.125 | r = 208 | g = 9 | b = 45 |
| index = 40 | y = 0.2500 | e = 0.50 | s = 0.250 | r = 255 | g = 0 | b = 0 |
| index = 41 | y = 0.3125 | e = -0.14 | s = -0.375 | r = 6 | g = 78 | b = 233 |
| index = 42 | y = 0.3125 | e = -0.14 | s = -0.250 | r = 14 | g = 86 | b = 177 |
| index = 43 | y = 0.3125 | e = -0.14 | s = -0.125 | r = 22 | g = 94 | b = 122 |
| index = 44 | y = 0.3125 | e = -0.14 | s = 0.000 | r = 30 | g = 101 | b = 66 |
| index = 45 | y = 0.3125 | e = -0.14 | s = 0.125 | r = 38 | g = 109 | b = 10 |
| index = 46 | y = 0.3125 | e = 0.00 | s = -0.375 | r = 55 | g = 55 | b = 247 |

| | | | | | |
|---|---|---|---|---|---|
| index = 47 | y = 0.3125 | e = 0.00 | s = -0.250 | r = 63 | g = 63 | b = 191 |
| index = 48 | y = 0.3125 | e = 0.00 | s = -0.125 | r = 71 | g = 71 | b = 135 |
| index = 49 | y = 0.3125 | e = 0.00 | s = 0.000 | r = 79 | g = 79 | b = 79 |
| index = 50 | y = 0.3125 | e = 0.00 | s = 0.125 | r = 87 | g = 87 | b = 23 |
| index = 51 | y = 0.3125 | e = 0.14 | s = -0.250 | r = 112 | g = 41 | b = 204 |
| index = 52 | y = 0.3125 | e = 0.14 | s = -0.125 | r = 120 | g = 49 | b = 148 |
| index = 53 | y = 0.3125 | e = 0.14 | s = 0.000 | r = 128 | g = 57 | b = 93 |
| index = 54 | y = 0.3125 | e = 0.14 | s = 0.125 | r = 136 | g = 65 | b = 37 |
| index = 55 | y = 0.3125 | e = 0.27 | s = -0.250 | r = 158 | g = 20 | b = 217 |
| index = 56 | y = 0.3125 | e = 0.27 | s = -0.125 | r = 166 | g = 28 | b = 161 |
| index = 57 | y = 0.3125 | e = 0.27 | s = 0.000 | r = 174 | g = 36 | b = 105 |
| index = 58 | y = 0.3125 | e = 0.27 | s = 0.125 | r = 182 | g = 44 | b = 49 |
| index = 59 | y = 0.3125 | e = 0.39 | s = -0.250 | r = 200 | g = 1 | b = 228 |
| index = 60 | y = 0.3125 | e = 0.39 | s = -0.125 | r = 208 | g = 9 | b = 172 |
| index = 61 | y = 0.3125 | e = 0.39 | s = 0.000 | r = 216 | g = 17 | b = 116 |
| index = 62 | y = 0.3125 | e = 0.39 | s = 0.125 | r = 224 | g = 25 | b = 61 |
| index = 63 | y = 0.3125 | e = 0.39 | s = 0.250 | r = 232 | g = 33 | b = 5 |
| index = 64 | y = 0.3125 | e = 0.50 | s = 0.000 | r = 255 | g = 0 | b = 127 |
| index = 65 | y = 0.3750 | e = -0.27 | s = 0.000 | r = 0 | g = 138 | b = 69 |
| index = 66 | y = 0.3750 | e = -0.27 | s = 0.125 | r = 8 | g = 146 | b = 14 |
| index = 67 | y = 0.3750 | e = -0.14 | s = -0.375 | r = 22 | g = 94 | b = 249 |
| index = 68 | y = 0.3750 | e = -0.14 | s = -0.250 | r = 30 | g = 101 | b = 193 |
| index = 69 | y = 0.3750 | e = -0.14 | s = -0.125 | r = 38 | g = 109 | b = 138 |
| index = 70 | y = 0.3750 | e = -0.14 | s = 0.000 | r = 46 | g = 117 | b = 82 |
| index = 71 | y = 0.3750 | e = -0.14 | s = 0.125 | r = 54 | g = 125 | b = 26 |
| index = 72 | y = 0.3750 | e = 0.00 | s = -0.250 | r = 79 | g = 79 | b = 207 |
| index = 73 | y = 0.3750 | e = 0.00 | s = -0.125 | r = 87 | g = 87 | b = 151 |

| index | y | e | s | r | g | b |
|---|---|---|---|---|---|---|
| index = 74 | y = 0.3750 | e = 0.00 | s = 0.000 | r = 95 | g = 95 | b = 95 |
| index = 75 | y = 0.3750 | e = 0.00 | s = 0.125 | r = 103 | g = 103 | b = 39 |
| index = 76 | y = 0.3750 | e = 0.14 | s = -0.250 | r = 128 | g = 57 | b = 220 |
| index = 77 | y = 0.3750 | e = 0.14 | s = -0.125 | r = 136 | g = 65 | b = 164 |
| index = 78 | y = 0.3750 | e = 0.14 | s = 0.000 | r = 144 | g = 73 | b = 109 |
| index = 79 | y = 0.3750 | e = 0.14 | s = 0.125 | r = 152 | g = 81 | b = 53 |
| index = 80 | y = 0.3750 | e = 0.27 | s = -0.250 | r = 174 | g = 36 | b = 233 |
| index = 81 | y = 0.3750 | e = 0.27 | s = -0.125 | r = 182 | g = 44 | b = 177 |
| index = 82 | y = 0.3750 | e = 0.27 | s = 0.000 | r = 190 | g = 52 | b = 121 |
| index = 83 | y = 0.3750 | e = 0.27 | s = 0.125 | r = 198 | g = 60 | b = 65 |
| index = 84 | y = 0.3750 | e = 0.27 | s = 0.250 | r = 206 | g = 68 | b = 9 |
| index = 85 | y = 0.3750 | e = 0.39 | s = -0.250 | r = 216 | g = 17 | b = 244 |
| index = 86 | y = 0.3750 | e = 0.39 | s = -0.125 | r = 224 | g = 25 | b = 188 |
| index = 87 | y = 0.3750 | e = 0.39 | s = 0.000 | r = 232 | g = 33 | b = 132 |
| index = 88 | y = 0.3750 | e = 0.39 | s = 0.125 | r = 240 | g = 41 | b = 77 |
| index = 89 | y = 0.3750 | e = 0.39 | s = 0.250 | r = 248 | g = 49 | b = 21 |
| index = 90 | y = 0.3750 | e = 0.50 | s = -0.250 | r = 255 | g = 0 | b = 255 |
| index = 91 | y = 0.4375 | e = -0.27 | s = -0.250 | r = 0 | g = 138 | b = 197 |
| index = 92 | y = 0.4375 | e = -0.27 | s = -0.125 | r = 8 | g = 146 | b = 141 |
| index = 93 | y = 0.4375 | e = -0.27 | s = 0.000 | r = 16 | g = 154 | b = 85 |
| index = 94 | y = 0.4375 | e = -0.27 | s = 0.125 | r = 24 | g = 162 | b = 29 |
| index = 95 | y = 0.4375 | e = -0.14 | s = -0.250 | r = 46 | g = 117 | b = 209 |
| index = 96 | y = 0.4375 | e = -0.14 | s = -0.125 | r = 54 | g = 125 | b = 153 |
| index = 97 | y = 0.4375 | e = -0.14 | s = 0.000 | r = 62 | g = 133 | b = 98 |
| index = 98 | y = 0.4375 | e = -0.14 | s = 0.125 | r = 70 | g = 141 | b = 42 |
| index = 99 | y = 0.4375 | e = 0.00 | s = -0.250 | r = 95 | g = 95 | b = 223 |
| index = 100 | y = 0.4375 | e = 0.00 | s = -0.125 | r = 103 | g = 103 | b = 167 |

FIG. 5D

| | | | | | |
|---|---|---|---|---|---|
| index = 101 | y = 0.4375 | e = 0.00 | s = 0.000 | r = 111 | g = 111 | b = 111 |
| index = 102 | y = 0.4375 | e = 0.00 | s = 0.125 | r = 119 | g = 119 | b = 55 |
| index = 103 | y = 0.4375 | e = 0.00 | s = 0.250 | r = 127 | g = 127 | b = 0 |
| index = 104 | y = 0.4375 | e = 0.14 | s = -0.250 | r = 144 | g = 73 | b = 236 |
| index = 105 | y = 0.4375 | e = 0.14 | s = -0.125 | r = 152 | g = 81 | b = 180 |
| index = 106 | y = 0.4375 | e = 0.14 | s = 0.000 | r = 160 | g = 89 | b = 124 |
| index = 107 | y = 0.4375 | e = 0.14 | s = 0.125 | r = 168 | g = 97 | b = 69 |
| index = 108 | y = 0.4375 | e = 0.14 | s = 0.250 | r = 176 | g = 105 | b = 13 |
| index = 109 | y = 0.4375 | e = 0.27 | s = -0.250 | r = 190 | g = 52 | b = 248 |
| index = 110 | y = 0.4375 | e = 0.27 | s = -0.125 | r = 198 | g = 60 | b = 193 |
| index = 111 | y = 0.4375 | e = 0.27 | s = 0.000 | r = 206 | g = 68 | b = 137 |
| index = 112 | y = 0.4375 | e = 0.27 | s = 0.125 | r = 214 | g = 76 | b = 81 |
| index = 113 | y = 0.4375 | e = 0.27 | s = 0.250 | r = 222 | g = 84 | b = 25 |
| index = 114 | y = 0.4375 | e = 0.39 | s = -0.125 | r = 240 | g = 41 | b = 204 |
| index = 115 | y = 0.4375 | e = 0.39 | s = 0.000 | r = 248 | g = 49 | b = 148 |
| index = 116 | y = 0.5000 | e = -0.27 | s = -0.250 | r = 16 | g = 154 | b = 213 |
| index = 117 | y = 0.5000 | e = -0.27 | s = -0.125 | r = 24 | g = 162 | b = 157 |
| index = 118 | y = 0.5000 | e = -0.27 | s = 0.000 | r = 32 | g = 170 | b = 101 |
| index = 119 | y = 0.5000 | e = -0.27 | s = 0.125 | r = 40 | g = 178 | b = 45 |
| index = 120 | y = 0.5000 | e = -0.14 | s = -0.250 | r = 62 | g = 133 | b = 225 |
| index = 121 | y = 0.5000 | e = -0.14 | s = -0.125 | r = 70 | g = 141 | b = 169 |
| index = 122 | y = 0.5000 | e = -0.14 | s = 0.000 | r = 78 | g = 149 | b = 114 |
| index = 123 | y = 0.5000 | e = -0.14 | s = 0.125 | r = 86 | g = 157 | b = 58 |
| index = 124 | y = 0.5000 | e = -0.14 | s = 0.250 | r = 94 | g = 165 | b = 2 |
| index = 125 | y = 0.5000 | e = 0.00 | s = -0.250 | r = 111 | g = 111 | b = 239 |
| index = 126 | y = 0.5000 | e = 0.00 | s = -0.125 | r = 119 | g = 119 | b = 183 |
| index = 127 | y = 0.5000 | e = 0.00 | s = 0.000 | r = 127 | g = 127 | b = 127 |

FIG. 5E

| | | | | | |
|---|---|---|---|---|---|
| index = 128 | y = 0.5000 | e = 0.00 | s = 0.125 | r = 135 | g = 135 | b = 71 |
| index = 129 | y = 0.5000 | e = 0.00 | s = 0.250 | r = 143 | g = 143 | b = 15 |
| index = 130 | y = 0.5000 | e = 0.14 | s = -0.250 | r = 160 | g = 89 | b = 252 |
| index = 131 | y = 0.5000 | e = 0.14 | s = -0.125 | r = 168 | g = 97 | b = 196 |
| index = 132 | y = 0.5000 | e = 0.14 | s = 0.000 | r = 176 | g = 105 | b = 140 |
| index = 133 | y = 0.5000 | e = 0.14 | s = 0.125 | r = 184 | g = 113 | b = 85 |
| index = 134 | y = 0.5000 | e = 0.14 | s = 0.250 | r = 192 | g = 121 | b = 29 |
| index = 135 | y = 0.5000 | e = 0.27 | s = -0.125 | r = 214 | g = 76 | b = 209 |
| index = 136 | y = 0.5000 | e = 0.27 | s = 0.000 | r = 222 | g = 84 | b = 153 |
| index = 137 | y = 0.5000 | e = 0.27 | s = 0.125 | r = 230 | g = 92 | b = 97 |
| index = 138 | y = 0.5000 | e = 0.27 | s = 0.250 | r = 238 | g = 100 | b = 41 |
| index = 139 | y = 0.5625 | e = -0.39 | s = 0.000 | r = 6 | g = 205 | b = 106 |
| index = 140 | y = 0.5625 | e = -0.39 | s = 0.125 | r = 14 | g = 213 | b = 50 |
| index = 141 | y = 0.5625 | e = -0.27 | s = -0.250 | r = 32 | g = 170 | b = 229 |
| index = 142 | y = 0.5625 | e = -0.27 | s = -0.125 | r = 40 | g = 178 | b = 173 |
| index = 143 | y = 0.5625 | e = -0.27 | s = 0.000 | r = 48 | g = 186 | b = 117 |
| index = 144 | y = 0.5625 | e = -0.27 | s = 0.125 | r = 56 | g = 194 | b = 61 |
| index = 145 | y = 0.5625 | e = -0.27 | s = 0.250 | r = 64 | g = 202 | b = 6 |
| index = 146 | y = 0.5625 | e = -0.14 | s = -0.250 | r = 78 | g = 149 | b = 241 |
| index = 147 | y = 0.5625 | e = -0.14 | s = -0.125 | r = 86 | g = 157 | b = 185 |
| index = 148 | y = 0.5625 | e = -0.14 | s = 0.000 | r = 94 | g = 165 | b = 130 |
| index = 149 | y = 0.5625 | e = -0.14 | s = 0.125 | r = 102 | g = 173 | b = 74 |
| index = 150 | y = 0.5625 | e = -0.14 | s = 0.250 | r = 110 | g = 181 | b = 18 |
| index = 151 | y = 0.5625 | e = 0.00 | s = -0.250 | r = 127 | g = 127 | b = 255 |
| index = 152 | y = 0.5625 | e = 0.00 | s = -0.125 | r = 135 | g = 135 | b = 199 |
| index = 153 | y = 0.5625 | e = 0.00 | s = 0.000 | r = 143 | g = 143 | b = 143 |
| index = 154 | y = 0.5625 | e = 0.00 | s = 0.125 | r = 151 | g = 151 | b = 87 |

FIG. 5F

| | | | | | |
|---|---|---|---|---|---|
| index = 155 | y = 0.5625 | e = 0.00 | s = 0.250 | r = 159 | g = 159 | b = 31 |
| index = 156 | y = 0.5625 | e = 0.14 | s = -0.125 | r = 184 | g = 113 | b = 212 |
| index = 157 | y = 0.5625 | e = 0.14 | s = 0.000 | r = 192 | g = 121 | b = 156 |
| index = 158 | y = 0.5625 | e = 0.14 | s = 0.125 | r = 200 | g = 129 | b = 101 |
| index = 159 | y = 0.5625 | e = 0.14 | s = 0.250 | r = 208 | g = 137 | b = 45 |
| index = 160 | y = 0.5625 | e = 0.27 | s = -0.125 | r = 230 | g = 92 | b = 225 |
| index = 161 | y = 0.5625 | e = 0.27 | s = 0.000 | r = 238 | g = 100 | b = 169 |
| index = 162 | y = 0.5625 | e = 0.27 | s = 0.125 | r = 246 | g = 108 | b = 113 |
| index = 163 | y = 0.5625 | e = 0.27 | s = 0.250 | r = 254 | g = 116 | b = 57 |
| index = 164 | y = 0.6250 | e = -0.50 | s = -0.250 | r = 0 | g = 255 | b = 0 |
| index = 165 | y = 0.6250 | e = -0.39 | s = -0.125 | r = 6 | g = 205 | b = 233 |
| index = 166 | y = 0.6250 | e = -0.39 | s = 0.000 | r = 14 | g = 213 | b = 177 |
| index = 167 | y = 0.6250 | e = -0.39 | s = 0.125 | r = 22 | g = 221 | b = 122 |
| index = 168 | y = 0.6250 | e = -0.39 | s = 0.250 | r = 30 | g = 229 | b = 66 |
| index = 169 | y = 0.6250 | e = -0.27 | s = -0.250 | r = 38 | g = 237 | b = 10 |
| index = 170 | y = 0.6250 | e = -0.27 | s = -0.125 | r = 48 | g = 186 | b = 245 |
| index = 171 | y = 0.6250 | e = -0.27 | s = 0.000 | r = 56 | g = 194 | b = 189 |
| index = 172 | y = 0.6250 | e = -0.27 | s = 0.125 | r = 64 | g = 202 | b = 133 |
| index = 173 | y = 0.6250 | e = -0.27 | s = 0.250 | r = 72 | g = 210 | b = 77 |
| index = 174 | y = 0.6250 | e = -0.14 | s = -0.125 | r = 80 | g = 218 | b = 21 |
| index = 175 | y = 0.6250 | e = -0.14 | s = 0.000 | r = 102 | g = 173 | b = 201 |
| index = 176 | y = 0.6250 | e = -0.14 | s = 0.125 | r = 110 | g = 181 | b = 145 |
| index = 177 | y = 0.6250 | e = -0.14 | s = 0.250 | r = 118 | g = 189 | b = 90 |
| index = 178 | y = 0.6250 | e = 0.00 | s = -0.125 | r = 126 | g = 197 | b = 34 |
| index = 179 | y = 0.6250 | e = 0.00 | s = 0.000 | r = 151 | g = 151 | b = 215 |
| index = 180 | y = 0.6250 | e = 0.00 | s = 0.125 | r = 159 | g = 159 | b = 159 |
| index = 181 | y = 0.6250 | e = 0.00 | s = 0.125 | r = 167 | g = 167 | b = 103 |

FIG. 5G

| | | | | | |
|---|---|---|---|---|---|
| index = 182 | y = 0.6250 | e = 0.00 | s = 0.250 | r = 175 | g = 175 | b = 47 |
| index = 183 | y = 0.6250 | e = 0.14 | s = -0.125 | r = 200 | g = 129 | b = 228 |
| index = 184 | y = 0.6250 | e = 0.14 | s = 0.000 | r = 208 | g = 137 | b = 172 |
| index = 185 | y = 0.6250 | e = 0.14 | s = 0.125 | r = 216 | g = 145 | b = 116 |
| index = 186 | y = 0.6250 | e = 0.14 | s = 0.250 | r = 224 | g = 152 | b = 61 |
| index = 187 | y = 0.6250 | e = 0.14 | s = 0.375 | r = 232 | g = 160 | b = 5 |
| index = 188 | y = 0.6250 | e = 0.27 | s = -0.125 | r = 246 | g = 108 | b = 240 |
| index = 189 | y = 0.6250 | e = 0.27 | s = 0.000 | r = 254 | g = 116 | b = 185 |
| index = 190 | y = 0.6875 | e = -0.50 | s = -0.250 | r = 0 | g = 255 | b = 127 |
| index = 191 | y = 0.6875 | e = -0.39 | s = -0.125 | r = 22 | g = 221 | b = 249 |
| index = 192 | y = 0.6875 | e = -0.39 | s = 0.000 | r = 30 | g = 229 | b = 193 |
| index = 193 | y = 0.6875 | e = -0.39 | s = 0.125 | r = 38 | g = 237 | b = 138 |
| index = 194 | y = 0.6875 | e = -0.39 | s = 0.250 | r = 46 | g = 245 | b = 82 |
| index = 195 | y = 0.6875 | e = -0.27 | s = -0.125 | r = 54 | g = 253 | b = 26 |
| index = 196 | y = 0.6875 | e = -0.27 | s = 0.000 | r = 72 | g = 210 | b = 205 |
| index = 197 | y = 0.6875 | e = -0.27 | s = 0.125 | r = 80 | g = 218 | b = 149 |
| index = 198 | y = 0.6875 | e = -0.27 | s = 0.250 | r = 88 | g = 226 | b = 93 |
| index = 199 | y = 0.6875 | e = -0.14 | s = -0.125 | r = 96 | g = 234 | b = 37 |
| index = 200 | y = 0.6875 | e = -0.14 | s = 0.000 | r = 118 | g = 189 | b = 217 |
| index = 201 | y = 0.6875 | e = -0.14 | s = 0.125 | r = 126 | g = 197 | b = 161 |
| index = 202 | y = 0.6875 | e = -0.14 | s = 0.250 | r = 134 | g = 205 | b = 106 |
| index = 203 | y = 0.6875 | e = -0.14 | s = -0.125 | r = 142 | g = 213 | b = 50 |
| index = 204 | y = 0.6875 | e = 0.00 | s = 0.000 | r = 167 | g = 167 | b = 231 |
| index = 205 | y = 0.6875 | e = 0.00 | s = 0.125 | r = 175 | g = 175 | b = 175 |
| index = 206 | y = 0.6875 | e = 0.00 | s = 0.250 | r = 183 | g = 183 | b = 119 |
| index = 207 | y = 0.6875 | e = 0.00 | s = 0.250 | r = 191 | g = 191 | b = 63 |
| index = 208 | y = 0.6875 | e = 0.00 | s = 0.375 | r = 199 | g = 199 | b = 7 |

FIG. 5H

| | | | | | | |
|---|---|---|---|---|---|---|
| index = 209 | y = 0.6875 | e = 0.14 | s = -0.125 | r = 216 | g = 145 | b = 244 |
| index = 210 | y = 0.6875 | e = 0.14 | s = 0.000 | r = 224 | g = 152 | b = 188 |
| index = 211 | y = 0.6875 | e = 0.14 | s = 0.125 | r = 232 | g = 160 | b = 132 |
| index = 212 | y = 0.6875 | e = 0.14 | s = 0.250 | r = 240 | g = 168 | b = 77 |
| index = 213 | y = 0.6875 | e = 0.14 | s = 0.375 | r = 248 | g = 176 | b = 21 |
| index = 214 | y = 0.7500 | e = -0.50 | s = -0.250 | r = 0 | g = 255 | b = 255 |
| index = 215 | y = 0.7500 | e = -0.39 | s = -0.125 | r = 46 | g = 245 | b = 209 |
| index = 216 | y = 0.7500 | e = -0.39 | s = 0.000 | r = 54 | g = 253 | b = 153 |
| index = 217 | y = 0.7500 | e = -0.27 | s = -0.125 | r = 88 | g = 226 | b = 221 |
| index = 218 | y = 0.7500 | e = -0.27 | s = 0.000 | r = 96 | g = 234 | b = 165 |
| index = 219 | y = 0.7500 | e = -0.27 | s = 0.125 | r = 104 | g = 242 | b = 109 |
| index = 220 | y = 0.7500 | e = -0.27 | s = 0.250 | r = 112 | g = 250 | b = 53 |
| index = 221 | y = 0.7500 | e = -0.14 | s = -0.125 | r = 134 | g = 205 | b = 233 |
| index = 222 | y = 0.7500 | e = -0.14 | s = 0.000 | r = 142 | g = 213 | b = 177 |
| index = 223 | y = 0.7500 | e = -0.14 | s = 0.125 | r = 150 | g = 221 | b = 122 |
| index = 224 | y = 0.7500 | e = -0.14 | s = 0.250 | r = 158 | g = 229 | b = 66 |
| index = 225 | y = 0.7500 | e = -0.14 | s = 0.375 | r = 166 | g = 237 | b = 10 |
| index = 226 | y = 0.7500 | e = 0.00 | s = -0.125 | r = 183 | g = 183 | b = 247 |
| index = 227 | y = 0.7500 | e = 0.00 | s = 0.000 | r = 191 | g = 191 | b = 191 |
| index = 228 | y = 0.7500 | e = 0.00 | s = 0.125 | r = 199 | g = 199 | b = 135 |
| index = 229 | y = 0.7500 | e = 0.00 | s = 0.250 | r = 207 | g = 207 | b = 79 |
| index = 230 | y = 0.7500 | e = 0.00 | s = 0.375 | r = 215 | g = 215 | b = 23 |
| index = 231 | y = 0.7500 | e = 0.14 | s = 0.000 | r = 240 | g = 168 | b = 204 |

FIG. 5I

| | | | | | |
|---|---|---|---|---|---|
| index = 232 | y = 0.7500 | e = 0.14 | s = 0.125 | r = 248 | g = 176 | b = 148 |
| index = 233 | y = 0.8125 | e = -0.27 | s = -0.125 | r = 104 | g = 242 | b = 237 |
| index = 234 | y = 0.8125 | e = -0.27 | s = 0.000 | r = 112 | g = 250 | b = 181 |
| index = 235 | y = 0.8125 | e = -0.14 | s = -0.125 | r = 150 | g = 221 | b = 249 |
| index = 236 | y = 0.8125 | e = -0.14 | s = 0.000 | r = 158 | g = 229 | b = 193 |
| index = 237 | y = 0.8125 | e = -0.14 | s = 0.125 | r = 166 | g = 237 | b = 138 |
| index = 238 | y = 0.8125 | e = -0.14 | s = 0.250 | r = 174 | g = 245 | b = 82 |
| index = 239 | y = 0.8125 | e = -0.14 | s = 0.375 | r = 182 | g = 253 | b = 26 |
| index = 240 | y = 0.8125 | e = 0.00 | s = 0.000 | r = 207 | g = 207 | b = 207 |
| index = 241 | y = 0.8125 | e = 0.00 | s = 0.125 | r = 215 | g = 215 | b = 151 |
| index = 242 | y = 0.8125 | e = 0.00 | s = 0.250 | r = 223 | g = 223 | b = 95 |
| index = 243 | y = 0.8125 | e = 0.00 | s = 0.375 | r = 231 | g = 231 | b = 39 |
| index = 244 | y = 0.8750 | e = -0.14 | s = 0.000 | r = 174 | g = 245 | b = 209 |
| index = 245 | y = 0.8750 | e = -0.14 | s = 0.125 | r = 182 | g = 253 | b = 153 |
| index = 246 | y = 0.8750 | e = 0.00 | s = 0.000 | r = 223 | g = 223 | b = 223 |
| index = 247 | y = 0.8750 | e = 0.00 | s = 0.125 | r = 231 | g = 231 | b = 167 |
| index = 248 | y = 0.8750 | e = 0.00 | s = 0.250 | r = 239 | g = 239 | b = 111 |
| index = 249 | y = 0.8750 | e = 0.00 | s = 0.375 | r = 247 | g = 247 | b = 55 |
| index = 250 | y = 0.8750 | e = 0.00 | s = 0.500 | r = 255 | g = 255 | b = 0 |
| index = 251 | y = 0.9375 | e = 0.00 | s = 0.000 | r = 239 | g = 239 | b = 239 |
| index = 252 | y = 0.9375 | e = 0.00 | s = 0.125 | r = 247 | g = 247 | b = 183 |
| index = 253 | y = 0.9375 | e = 0.00 | s = 0.250 | r = 255 | g = 255 | b = 127 |
| index = 254 | y = 1.0000 | e = 0.00 | s = 0.000 | r = 255 | g = 255 | b = 255 |

FIG. 5J

COLOR TABLE DISPLAY FOR INTERPOLATED COLOR AND ANTI-ALIASING

This is a continuation of application Ser. No. 07/574,127 filed Aug. 29, 1990, now abandoned.

BACKGROUND OF THE INVENTION

1. Field of the Invention

The present invention relates to the rendering of high-quality images on a display with moderate resolution and, more particularly, to the rendering of high-quality images using a color table.

2. Description of the Related Art

In today's high-tech office, documents are often created in electronic form and them printed. Tools for document creation have become increasingly powerful, allowing the user to create complex and sophisticated images. This advance is expressed in the phrase "desktop publishing", which implies that the user now has at his or her fingertips the capabilities which formerly were available only through a publisher. Printing hardware has also improved with high-resolution laser printers and the emerging support for full color. One of the problems that arises with the current technology is that the user may be surprised to find that the printed output does not look the same as the electronic image displayed on the workstation. Many programs try to make the two images match, supporting a what-you-see-is-what-you-get (or WYSIWYG) approach. Hardware differences, however, may make true matching impossible. One such difference is resolution. A laser printer may be able to print at 300 spi, while the workstation may support only about a quarter of this density. A compensating difference is that a sophisticated display may support continuous gray levels and/or colors, while a print may have to use halftones. A color display will often be driven through a 256 element color lookup table, limiting the number of colors which may be displayed at any one time, while a printer, using halftones, can produce many more. Finally, the color primaries and white point of the workstation may be different from the inks and paper available at the printer. It would be desirable, therefore, to display an image at the workstation which overcomes most of these differences.

The problem of low resolution in the display can be reduced by use of the display's intensity level. In computer graphics, this technique has long been used to reduce the aliasing effects of the low resolution display. Effects such as "jaggies" in lines as they cross pixel boundaries, and "drop out" of small objects which fall between the pixels, are countered by setting the pixel intensities to intermediate levels to reflect that part of the pixel which is covered by the object and the part which is not. Perhaps the simplest anti-aliasing technique, as illustrated in FIG. 1, is to compute the image at a higher resolution, and then average the pixel values to obtain the lower resolution intensity. For example, if the image were created at four times the resolution, then four by four blocks of pixels would be averaged to obtain the display pixel value. This is, in effect, saying that the display pixels are non-overlapping squares with abrupt edges. Real pixels tend to be round and overlapping, with tapering edges. More sophisticated techniques, therefore, apply a digital filter to the high-resolution image which, in effect, convolves the image with the pixel profile.

In the area of desktop publishing, the effects of resolution are strongly apparent in text. Fonts available for the coarse screen resolution are large and simplistic. They cannot show the subtle effect of different font selections. Their size may make them out of proportion to the rest of the page. One may be unable to place the characters in the same positions as on the printed page due to crowding, giving either false page layout and line breaks, or some unreadable representation of the page.

The anti-aliasing techniques of computer graphics can be applied to the display of text. The fine elements and non-integral pixel widths of character strokes become partially illuminated pixels. This gives the illusion of increased resolution, and permits much smaller font sizes to be displayed. It also permits the placing of characters at non-integral pixel positions.

The human visual system is able to distinguish a large number of colors. To cover this range of colors, display devices often provide 256 choices (8 bits) for each of the three primary colors, red, green and blue. This is a total of 24 bits or $2^{24}$ possible colors. To simultaneously render any or all of these colors requires a backing frame buffer with 24 bits per pixel. To reduce cost, displays usually provide a smaller pallet of colors which may be selected from this large set. This is implemented by means of a color lookup table. A 256 entry table can be accessed by an 8-bit index. Each table entry can contain a 24-bit color specification. Thus, as shown in FIG. 2, a frame buffer with only 8-bits per pixel can be used by looking up each pixel value in the color table to obtain 24-bit color. The display can produce $2^{24}$ colors, but can render only 256 of them at any one time.

Color lookup tables have proven useful in their own right. By changing a value in the table, one can alter the appearance of all the pixels which reference this table entry. This is much faster than altering the pixels individually. Color tables can support fast color manipulation, structuring of the image, color correction, and even animation effects. The limited set of simultaneous colors, however, presents a problem concerning which colors should be chosen for the color table entries. Scanned images and some computer generated effects contain far more colors than the allowed 256. One must somehow pick colors that do not deviate too far from the true colors of the image. One would also like to reduce the false contours which arise when a smooth variation in color is displayed as a jump between one producible color and the next. This is just aliasing in color space. One approach to this problem is to first analyze the image to determine which colors are most representative. This can be a costly process. An alternative approach is to set the table to a fixed set of distributed colors, and then superimpose halftoning techniques to give the appearance of intermediate colors. In this approach, resolution is being traded for intensity levels of the color primaries. The halftone screen is used to choose between the available bounding colors for each pixel. A rectangular, dispersed dot screen applied to each of the primary color components is straightforward and adequate. It also allows one to display the image as it is drawn. An error diffusion approach has also been tried. This gives slightly better results, but must be applied to the entire image, and is not used with individual image components.

Since color is a three-dimensional space, halftoning is applied three times for each pixel to achieve the appearance of intermediate values for each of the three color coordinates. The elements of the color lookup table are partitioned along the color coordinate axis to support the independent halftoning of each coordinate. If the coordinate axis is red, green and blue, the 8-bit color table index may be split into three bits of red, three bits of green, and two bits of blue. This gives eight shades of red, eight shades of green, and four shades of blue, plus all their combinations. Blue is chosen to receive only two bits because the eye is less sensitive to blue. An alternative is to allocate six shades of red, six shades of green, and six shades of blue. The color table is thought of as a three-dimensional array with six elements in each dimension. This gives the mapping from color coordinates to color table index.

There are many possible coordinate systems used in describing color space besides red, green and blue. One alternative is to rotate and scale the axis so that one corresponds to the luminance Y. Luminance is a measure of how bright the color appears (yellow appears brighter than blue). The other two coordinates give the chrominance information. This approach is used in the television industry, which implements the YIQ color model. The Y component gives the luminance, which is shown on black-and-white sets. All three coordinates are used for color television.

One color encoding standard describes the YES color model. Again, Y is the luminance, and the E and S coordinates give the chrominance. The E coordinate is the green to red axis, and the S coordinate is the blue to yellow axis using the red, green, and blue primaries and white point. The YES coordinates are given by $$Y = 0.253\ R + 0.684\ G + 0.063\ B$$

$$E = 0.5\ R - 0.5\ G$$

$$S = 0.25\ R + 0.25\ G - 0.5\ B$$

where R, G, B are the red, green and blue coordinates of the color. One advantage of this color model is that the E and S coordinates are very easy to calculate.

The YES color coordinates are not visually uniform. Equivalent displacements in these coordinates generally do not appear to the eye as equivalent changes in color. There are visually uniform color spaces, notably the L*a*b* and L*u*v* color models. Using these coordinates for color table assignments and halftoning gives slightly better results, since the colors appear uniformly distributed, and the halftoning is linear with respect to appearance. However, these coordinates are much costlier to calculate.

U.S. Pat. No. 4,812,903 to Wagensonner et al. discloses a system for electronically enhancing an image of a colored original in order to produce a copy of that original. RGB color signals are first passed through a gray balancing unit and then to an illuminance and chrominance generating unit. In the generating unit, a luminance signal and a pair of chrominance signals corresponding to color image signals of an image to be copied are formed. The luminance signal is processed to enhance. sharpness of an image, and one or both of the chrominance signals are also processed in a color saturation adjusting unit. Lookup tables are provided for converting the adjusted chrominance signals back to corresponding RGB color signals.

U.S. Patent No. 4,841,360 to Birgmeir discloses a system for electronically enhancing an image to be reproduced. The system includes a lookup table for taking into account a characteristic function of a CRT on which an image is to be displayed. The characteristic function constitutes the brightness or illumination of the CRT.

U.S. Patent Nos. 4,831,434 and 4,812,902 Fuchsberger disclose methods for correcting color saturation in electronic image processing. Color retention is corrected by converting RGB color signals into a luminance signal and two chrominance signals which are subsequently adjusted and converted back to color signals by using various lookup tables.

U.S. Patent No. 4,758,885 to Sasaki et al. discloses a method of processing color images wherein a high resolution image is converted so that it can be displayed on a lower resolution color printer or the like. An input image of full color is converted over to a L*u*v* system which is based on brightness and saturation. The L*u*v* components are then compressed, converted into CMY signals and sent to a printer. A method of calculating the L*u*v* components from an RGB signal is shown.

U.S. Pat. No. 4,887,151 To Wataya discloses an encoding apparatus for color image data wherein an RGB signal is converted into a L*a*b* color space and then into a LSC color space. The LSC color space consists of a luminosity component, a structure component and a color component. An image is broken down into smaller blocks which are converted into the LSC color space. Color lookup tables are used to convert an RGB image into an intermediate L*a*b* color space.

U.S. Patent No. 4,916,531 to Genz et al. discloses a color video processing circuit wherein an RGB image is converted into a HSI system. The circuit shown is capable of doing the RGB to HSI conversion which is usually done using software. The HSI system allows a user to interpret a color more easily. Several related methods of converting an RGB image into another system are shown.

While the related art recognizes the problems involved in processing color images on a lower resolution printer or monitor, the art does not provide an efficient and effective rendering of high resolution, high quality color images on a display of moderate resolution and limited color selectability in a manner which results in minimal aliasing.

OBJECTS AND SUMMARY OF THE INVENTION

Accordingly, one object of the present invention is to render a high quality image on a display with moderate resolution.

Another object of the present invention is to provide a color display of images which reduces aliasing of solid areas such as lines and text.

A further object of the present invention is to provide a color display of images wherein the displayed colors do not appear to deviate from the true colors of the image.

To achieve the foregoing and other objects and advantages, and to overcome the shortcomings discussed above, a scheme for the color display of images on a device with a moderate sized color table, e.g., a 256 entry color table, is provided. Halftoned binary images are built for each of the three color components, at four times the display resolution. Bit values are summed in four-by-four cells to determine average values for display resolution pixels. The average values are then mapped to a color table. The YES color model is used to obtain the color coordinates to separate the colors into luminance and chrominance components, allowing more weight to be given to the luminance from which the eye extracts most of the information, and to yield only 275 real colors for a 17×9×9 grid of coordinate values which is close to the 256 entry size of the color table. Anti-aliasing is provided of solid areas, and color halftoning is provided to give the appearance of colors between those available from the color table. The color table may be constructed to include color coordinate transformations and gamma correction.

BRIEF DESCRIPTION OF THE DRAWINGS

The invention will be described in detail with reference to the following drawings in which like reference numerals refer to like elements and wherein:

FIGS. 4A-4K show coordinates of realizable colors according to the present invention; and FIGS. 5A-5J show coordinates of a color lookup table according to the present invention.

DETAILED DESCRIPTION OF THE PREFERRED EMBODIMENTS

Figure 1:
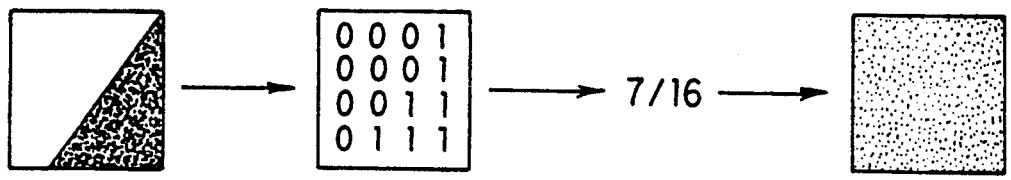
FIG. 1 illustrates the summing of high resolution values to obtain an average gray level.
Figure 2:
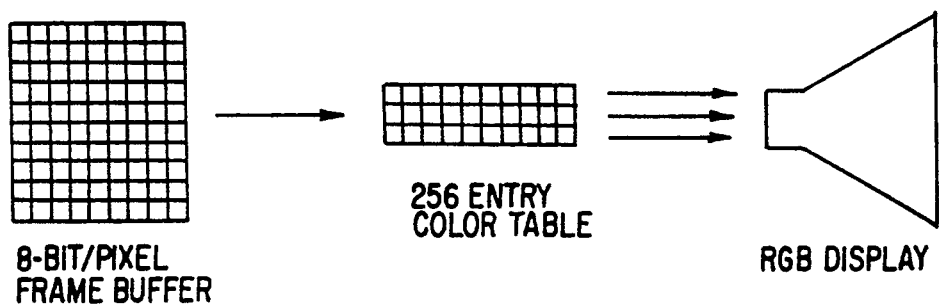
FIG. 2 illustrates the accessing of a color table by a frame buffer to obtain a color display.
Figure 3:
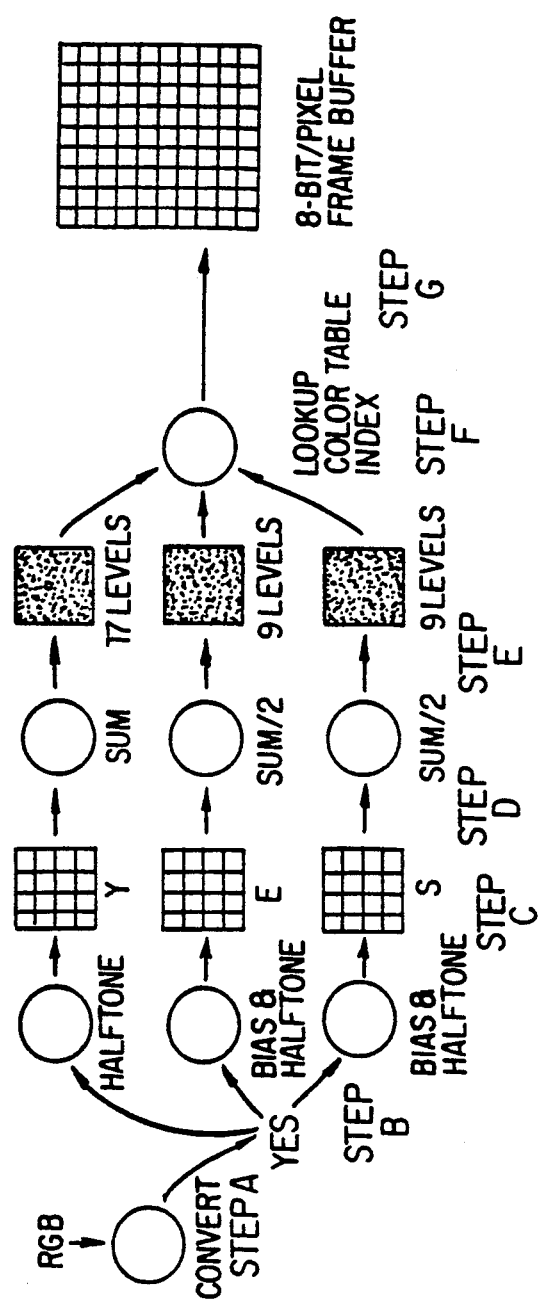
FIG. 3 illustrates the generating of high quality images on a d with moderate resolution.

Referring now to the drawings, and particularly to FIG. 3 thereof, high-quality images are created on a display having moderate resolution in two steps. The first step is the creation of an image at four times the display resolution but at only one bit per sample. For a display with resolution at 75 spi, this first step would create binary images at 300 spi. This first stage may match printer resolution, allowing one to use the printer's fonts and algorithms in constructing the image. At this stage, the image is very near to that which would be produced by the printer. One possible difference, however, is that the color model to be used is a variation of the YES model. The variation is a slight tilting of the luminance axis, in order to make it easier to calculate. The Y, E and S coordinates are defined as:

$$Y = 0.25\ R + 0.625\ G + 0.125 B$$

$$E = (r-g)/2$$

$$S = (r+g)/4 - b/2$$

These may be calculated using only shifts and adds. The first stage yields three one-bit-per-pixel rasters, one for each of the Y, E, and S coordinates as shown by step A of FIG. 3. In order to reduce color and gray scale images to one-bit-per-pixel, a halftone should be applied as shown by step B of FIG. 3. The halftone should be in the dispersed-dot family and sufficiently large to generate enough levels to defeat false contouring in the image. A 128 level 45 degree Bayer screen, for example, gives good results.

The second stage of the processing is to sum the pixels which are set in M by N cells, e.g., 4×4 cells, as shown by step C of FIG. 3 of the high resolution binary raster, and to use these sums to determine a color-table index for the display raster. Summing the 4 by 4 cells for the luminance Y yields a luminance value ranging between 0 and 16 as shown by step D of FIG. 3. Therefore, there are seventeen possible luminance values. The effect of this action for black-and-white objects, such as lines and text, is to average the high resolution black-and-white cell into a low resolution gray value. This is precisely the simple approach to anti-aliasing. One is, in effect, convolving the high-resolution image with an abrupt square pixel profile. The technique provides antialiasing, giving smooth graphics, "fine" lines, and most important, gray characters allowing readable text at small point sizes. The appearance of the text and graphics will be close to that for the printed page.

The chrominance components (E and S) are biased so that they are non-negative. If the maximum RGB sample value is M, then E and S range between $-M/2$ and $M/2$. After biasing by M/2, the range is again 0 to M, and the same halftone scheme which is used for luminance can be applied to the chrominance. The resulting halftoned rasters are also summed over 4 by 4 cells as shown by step C of FIG. 3. The resulting values between 0 and 16 as shown by step D of FIG. 3 are halved to yield values between 0 and 8 or nine possible levels as shown by step E of FIG. 3. This results in a loss of information. If one uses the same halftone pattern for chrominance and luminance, the 128 levels produced by the halftone are cut in half for each of the chrominance axes. The luminance and chrominance sums are used to select the color-table index as shown by step E of FIG. 3. Note that the effect of halftoning the three color components, and then summing the 4 by 4 cells to get the color index, is to yield a halftone between the producible colors. An 8 by 6 halftone cell for binary values becomes a 2 by 4 halftone cell for interpolating between producible colors. False contours are reduced and a range of apparent colors is greatly increased. The 2 by 4 cell is small enough to not be objectionable.

The reduction of 17 levels to 9 levels for the chrominance components is done in order to more closely match the number of colors available in the color table (assumed to be 256). The reduction is done in the chrominance instead of the luminance because the eye is much more sensitive to information in the luminance channel. This is why black-and-white photographs and television offer effective renditions of a scene.

Some of the chrominance information may be retained if, when reducing from 17 to 9 levels, one rounds down half of the time and rounds up the other half. The choice for rounding up or down should be decoupled from the halftone screen, or should alternate between screen cells so the full 128 levels are displayed over two halftone cells.

Even with the reduction of the chrominance components to 9 levels, there are 17×9×9=1377 possible color specifications, or over five times the number of colors available through the color table. However, most of the YES coordinates do not correspond to real producible colors. As indicated in FIGS. 4A-4F, the number of real colors among those 1377 specifications is only 275. This is much closer to the color table size. One approach to squeeze the set of colors into the color table is to shift the positions of the chrominance values so that more color specifications fall outside the gamut of producible colors. For example, if instead of selecting the E values (on a range of $-0.5$ to 0.5) at the uniform steps of $-0.5, -0.375, -0.25, -0.125, 0.125, 0.25, 0.375, 0.5$, one compresses the coordinates at the ends and expands towards the center of the E parameter range to get the values $-0.5, -0.39, -0.27, -0.14, 0, 0.4, 0.27, 0.39, 0.5$, then there are just 255 valid colors as indicated in FIGS. 5A-5E. The threshold levels of the halftone screen used with the E separation can be adjusted to match these spacings.

An alternative approach to reducing the number of colors from 275 to 256 is to select a pair of close colors specifications and map them both to the same color table entry. The color table may actually contain an intermediate color value. Combining 19 such pairs will reduce the number of colors to 256.

Converting from the high resolution bitmaps to the display resolution raster involves first summing the bits in M by N cells such as 4×4 cells to get average values for color model coordinates such as the Y, E, and S coordinates, and then finding the color-table index which corresponds to these values. Summing the bits within a nibble can be quickly done by a table look up. A 256 entry table can be accessed by a byte, and a byte can be returned containing the sums of bits for the two nibbles in the original byte. Both sums can be coded into the same byte and later separated with logical shifts and masks. Thus, a byte containing the bits 10110010 would give the table entry 00011001, indicating that the right nibble had one 1 bit (low order three bits of the table value, 001) and the left nibble had three 1's (next three bits in the table value, 011). To quickly sum the bits for a 4 by 4 cell, the table look up and masking are used to sum the bits in the nibbles for each of the four scanlines of the cell. Sum these four results, in turn, and the entire cell has been totaled.

Once the average Y, E, and S values have been determined they are used to find the color table index (Step F in FIG. 3). Since there are only 1377 possible combinations, a table of this size can be constructed. However, since less than a fifth of these values are real colors, the table is rather sparse. One can save space if one is willing to pay the cost of several layers of indirection. The space saving alternative first checks for 0 luminance, and handles it as a special case. It next uses a 16 entry-table (YT), which is accessed by luminance. This table gives a starting position in a second table and a corresponding E value. This leads to a 67 entry-table (ET), which gives starting positions in the color table and a corresponding S value. Entries in the color table are organized by Y, then E, and then S. A look up process can be as follows:

$Y-index = Y$ $E-index = YT.start[Y-index] + (E - YT.E-value[Y-index])$ $color-table-index = ET.start[E-index] + (S - ET.S-value[E-index])$ If either the E index or the color table index is less than the corresponding start value for the YT table or ET table, or if either is greater than or equal to the next start entry in their corresponding table, then the color is out of range of available colors in the table. A color can be out of range because the color specified is outside the monitor's gamut, or because it is one of the colors lost in reduction from 275 to 256, or perhaps through some interaction of color placements on the halftone screen. In these situations, one should select the "closest" real color available. When using the YT and ET tables, one can choose the color for the limiting the E or S value (whichever is out of range), or one can attempt to match the chrominance at a different luminance. If the full 1377 entry table is used, then one can determine in advance the best approximation to the unrealizable color and enter it in the table.

When the color table is constructed, the desired RGB values calculated from the YES settings are assumed to be in standard color coordinates. They are converted to the coordinates of the display (step G of FIG. 3), and gamma correction is applied in order to get the actual color table entries. Therefore, the scheme interprets and displays colors in accordance with the standard coordinate system and will match the colors producible by a printer, which is also calibrated to these coordinates.

The processing of an image is most efficiently done in two stages; the first stage builds the high resolution bitmaps, and the second stage converts the bitmaps to the display raster. One effect of the two stage processing is that the image is not displayed until components have been entered into the high resolution display and the second stage processing takes place. This means that the image is not visible as individual components are added, and interactive applications such as editing could not be carried out. However, one can maintain both representations of the image, for example, whenever a pixel in the high-resolution bitmap is changed, one can re-sum the 4 by 4 cell that includes it and update the corresponding pixel in the display raster. The image will then be visible as it is constructed and interactive applications are possible. The calculation of the display raster color table index is done roughly sixteen times as often. The update is only needed for pixels which actually change. For sparse images, therefore, this approach may actually be more efficient than the one time conversion of the entire image. For dense images which fill the screen and may have overlapping components, however, updating on every high-resolution pixel change is more expensive.

The image generated as set forth above, even though it is provided by a display having moderate resolution in comparison with a printer, will not appear different than the printer image. The color of the display image will appear to precisely match that of the printer image. An illusion will be created of increased resolution matching that of the printer image. Anti-aliasing of solid areas such as lines and text is provided. The resulting colors of the display image can be transformed to correspond to various standards. Thus, many problems normally associated with image display in moderate resolution monitors are overcome.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A method for providing high-quality images in a display having moderate resolution, the method comprising the steps of:
building halftone images comprising binary pixels for each of three primary color components at a resolution greater than the display resolution;
summing halftone values of the binary pixels for each of the three primary color component halftone images corresponding to each of the pixels of the display resolution; and using the summed halftone values to determine an index for a look-up color table for creating a color model representation, the look-up color table containing entries representing a number of colors available in the color model representation, said step of summing halftone values including summing the binary pixels of the greater resolution over M by N cells to obtain the index where M and N are integers, the color model representation having a number of displayable colors approximately matching the number of colors available in the color table.

2. The method as recited in claim 1, wherein:
said halftone image building step includes converting the color components using a color model comprising color coordinates to describe color space.

3. The method as recited in claim 2, further comprising:
using a YES color model to describe the color space, where Y, E and S are color model coordinates, the Y coordinate representing luminance and the E and S coordinates representing chrominance.

4. The method as recited in claim 1, wherein:
said halftone image building step includes applying halftones at least three times for each display resolution pixel.

5. The method as recited in claim 1, further comprising the step of:
organizing entries in the look-up color table to provide start positions in the look-up color table for space reduction.

6. The method as recited in claim 1, further comprising the step of:
displaying the image during the building, summing, and using steps.

7. The method as recited in claim 1, wherein:
said summing step includes summing the pixels of the greater resolution over 4 by 4 cells.

8. The method as recited in claim 2, wherein:
said halftone image building step uses a color model which separates luminance from chrominance.

* * * * *